Dec. 21, 1965    E. T. DUNCAN    3,225,155
PLUG-TYPE SWITCHING CONNECTOR
Filed Sept. 7, 1962    2 Sheets-Sheet 1

INVENTOR.
Edward T. Duncan
BY
Wooster, Davis & Cifelli
Atty.

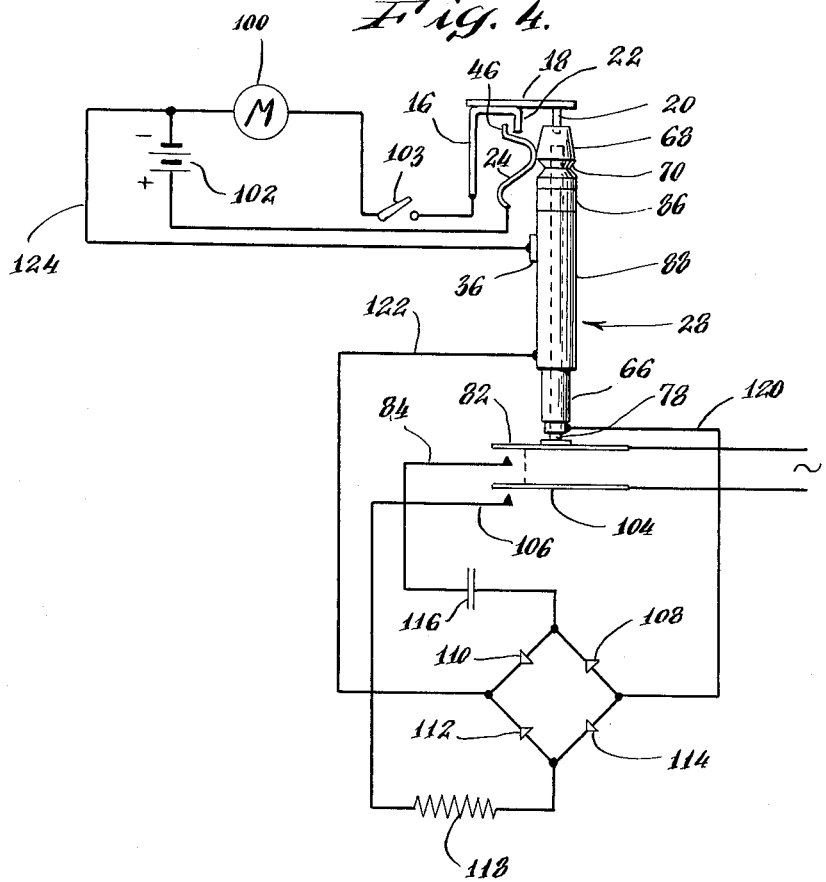

United States Patent Office 3,225,155
Patented Dec. 21, 1965

3,225,155
PLUG-TYPE SWITCHING CONNECTOR
Edward T. Duncan, Westport, Conn., assignor to Product Research Associates Incorporated, Westport, Conn., a corporation of Connecticut
Filed Sept. 7, 1962, Ser. No. 221,952
5 Claims. (Cl. 200—51.09)

This invention relates to an electrical connector and, more particularly, to a plug and jack assembly specifically designed for use with rechargeable battery-operated appliances.

One of the more convenient aspects of modern-day living has been the recent rise in the number of truly portable appliances and tools which have self-contained power supplies. Many of the advances in this field have been made possible by the development of small batteries which may be easily recharged from a standard household power supply and which are also sturdy, long-lasting, and powerful. Among the many appliances and tools which have been developed in this category are electric shavers, automatic toothbrushes, rechargeable flashlights, a variety of portable motor-driven appliances, and various other types of apparatus which are becoming more and more familiar.

In devices wherein a high degree of portability is required or desirable, it is usually necessary to separate the charging circuit from the appliance itself. An example of such an appliance is the electric shaver. A shaver of this type customarily includes within the shaver body, a motor and a rechargeable battery which drives the motor. In order to recharge the self-contained batteries from a standard convenience outlet, it is necessary that the normal alternating current potential be reduced, rectified, and applied to the batteries without passing through the motor circuit. In order to reduce the bulk and weight of the portable shaver, the rectifier circuit is separated from the battery and motor circuit of the shaver. A separate rectifying unit is often employed which may be plugged into a convenience outlet and into which the saver may also be plugged in order to restore its batteries to operating condition. One such type of commercial electric shaver has a separate unit which includes a full-wave rectifier in series with a resistor and a capacitor for reducing the potential by the condenser leak method. It will be understood that alternative means, such as a transformer, may also be employed. The 110 volt household voltage supply is applied directly across the rectifier circuit. The output of the rectifier circuit is then connected through suitable switching means to the shaver, which may be plugged into the unit. It is, of course, important that no exposed portions of the recharging assembly be energized while direct contact with a user is possible. It will also be apparent that the motor circuit must be disconnected from the battery prior to the energization of the rectifier unit.

Various approaches have been taken in prior art apparatus to perform the foregoing functions. One such approach has been to provide a relatively complex plug system between the charging unit and the shaver for maintaining the shaver in precise alignment with the charger. The precise alignment is required because the switching functions are performed by a rotating switch mounted in the shaver which contacts a three-dimensional cam on the charging unit. As the shaver and charging unit are pressed together, the switch is thereby rotated to perform the switching operations.

It will be apparent that the complexity of the prior art devices results in great expense to both manufacturer and consumer and also to mechanical and electrical failures. Furthermore, the user must exercise care in joining the units to assure they are properly aligned.

It is, therefore, a primary object of this invention to provide an improved, simplified connector for a rechargeable battery-operated appliance. Other objects are to provide such a connector which removes all shock hazard, is less expensive, is more reliable, performs the necessary switching functions in the correct sequence, and does not require precise alignment of the recharging unit with the appliance when the two are plugged together.

The foregoing objects are attained by means of a switching device which includes a jack on the appliance and a plug on the recharger. The plug is substantially tubular and contains an actuating pin which extends into the charger housing. The pin is longitudinally movable within the plug and its extending end contacts and actuates a double-pole switch which connects the main power supply to the rectifying circuit. Within the appliance housing and adjacent the jack there is provided a switch which deactivates the appliance motor from the rechargeable battery and is operable upon insertion of the plug. There is also provided in the appliance housing, a stud which is axially aligned with the jack so as to enter the end of the tubular plug. This stud contacts the end of the actuating pin and thereby forces it toward the charger to close the double-pole switch therein after the motor switch has been disconnected.

The construction of an apparatus in accordance with this invention will be more readily understood by reference to the following description, the appended claims, and the figures of the attached drawing, wherein:

FIG. 4 is a partially schematic illustration of the charging circuit and motor circuit at an intermediate position during the mating process.

Figure 1:
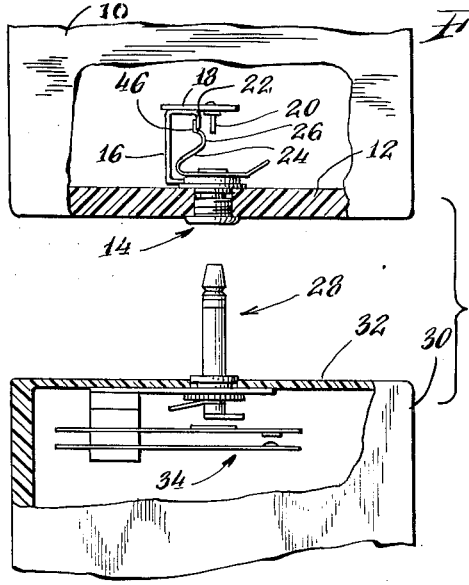
FIG. 1 is an illustration of the plug and jack assemblies of this invention prior to mating.
Figure 2:
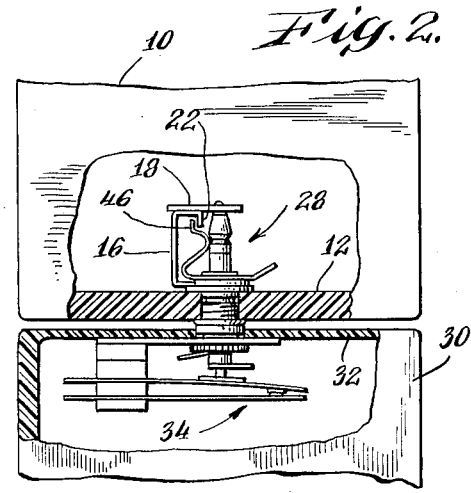
FIG. 2 is an illustration of the plug and jack assemblies of FIG. 1 after they have been mated.

In FIG. 1 there is illustrated a portion of the case 10 of a portable battery-operated appliance. The case includes a base wall 12 which contains a hole. A jack 14 is inserted in the hole and rigidly clamped to wall 12 in a manner to be later described. The portion of jack 14 inside case 10 includes a switch member 16 in the form of an inverted L. To the upper horizontal portion of switch member 16 there is affixed a horizontally extending shelf 18 of an insulating material. Shelf 18 carries a vertically downwardly extending stud 20 which is aligned with the axis of jack 14. Switch member 16 also includes a downwardly extending switch contact 22 which extends substantially parallel to stud 20. Jack 14 carries an additional substantially S-shaped switch member 24 which contacts switch contact 22 to provide a normally closed switch. The curve 26 of the S extends into the path of the plug 28 which is provided on the recharging assembly. A portion of the body 30 of the recharging assembly is illustrated in the lower half of FIG. 1. This assembly includes a wall 32 which is also provided with a hole for plug 28. Body 30 includes a normally open double-pole single-throw switch 34. Switch 34 is actuated and closed upon the mating of plug 28 and jack 14 in the manner to be described.

Figure 3:
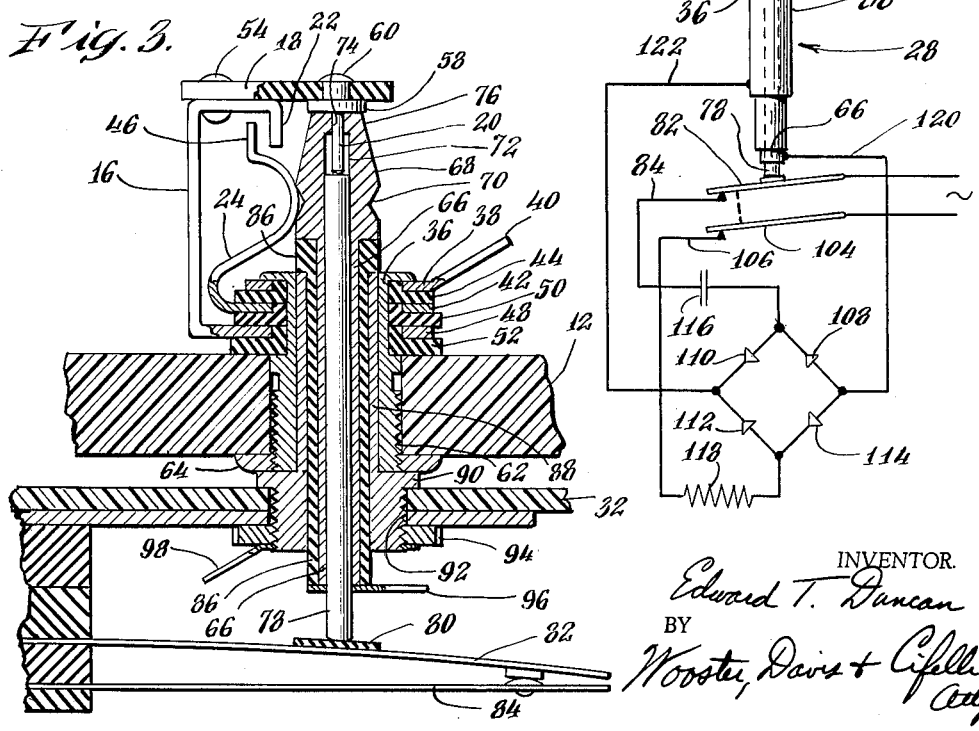
FIG. 3 is a detailed cross-sectional elevational view of the plug and jack assembly of FIG. 2.

The specific manner in which the components of this invention are constructed and mounted will be shown in more detail in FIG. 3. The jack 14 (FIG. 1) will be seen to comprise an electrically conductive cylindrical sleeve 36 which is flanged at its upper end and is threaded at its lower end. Between the flanged portion of sleeve 36 and base wall 12 there are provided a plurality of alternating conducting washers and insulating washers. The uppermost conducting washer 38 is in electrical contact with the flange of sleeve 36 and is provided with a tab 40 to provide an electrical connection thereto. An intermediate conducting washer 42 is spaced below washer 38 and is separated therefrom by an insulating washer 44. Washer 42 has connected to it and integral therewith a flat spring-like switch member 24 which is substantially S-shaped and at its upper end is provided with a movable contact 46. The third and lowest conducting washer 48 is separated from the intermediate washer 42 by an insulating washer 50 and is also separated from the appliance base wall 12 by an insulating washer 52. The inverted L-shaped switch member 16, previously alluded to, is an integral part of washer 48 and extends vertically upward as illustrated. Insulating shelf 18 is connected to the horizontal upper portion of switch member 16 by means of a suitable rivet 54. The upper portion of the L-shaped switch member 16 is bent vertically downward to form switch contact 22. A downwardly extending vertical stud 20 is also connected to horizontal shelf 18 and is held in place by means of a lower flange 58 and a rivet head 60. Stud 20 is aligned with the axis of the opening in jack 14 for reasons that will soon become apparent. The lower threaded portion 62 of jack 14 extends below the opening provided in base wall 12. The jack assembly is then held in position by means of a nut 64 which screws onto threaded portion 62 and compressively holds the jack in the hole in body wall 12. Although not illustrated, it will be understood that suitable tabs are provided on washers 42 and 48 for making electrical connections thereto.

The plug 28 comprises a central tubular member 66 which is provided at its upper end with a flaring tip 68 having around its circumference a groove 70. A hole 72 is provided within the tubular member 66 which extends from the lower terminus almost to the upper terminus of the plug. However, hole 72 terminates just short of the upper end. A smaller diameter hole 74 is then drilled in the end of the plug and communicates between hole 72 and the upper tip of the plug. This hole is of such a size as to slidably receive therein the stud 20. At the same time, the difference in size between holes 74 and 72 provides an upper shoulder 76 which serves as a stop for actuating pin 78. The lower end of actuating pin 78 rests against an insulating strip 80 which bridges the gap between a first switch pole 82 and a second switch pole 104, which is not shown in FIG. 3 but is illustrated schematically in FIGS. 4 and 5. These form the two poles of a double-pole single-throw switch which is used to control the flow of electrical current from the convenience outlet to the rectifying circuit. Stationary switch member 84 provides the stationary contact for pole 82 and a similar contact is provided for the other pole. Surrounding the central tubular member 66 of plug 28 is an insulating cylinder 86. Insulating cylinder 86 is formed with an upper flange, as shown, which serves to insulate the tubular member 66 from a conducting jacket 88. The lower end of conducting jacket 88 flares into a flange 90 which abuts against wall 32 and a lower threaded bushing 92 which serves to secure the plug assembly to wall 32 by means of a nut 94. A lower electrical connecting tab 96 allows an electrical connection to be made to the central tubular member 66 of the plug. A second electrical connecting tab 98 allows a connection to be made to the conducting jacket 88. It will now be noted that an electrical connection exists from tab 98 through conducting jacket 88 and sleeve 36 to tab 40.

Figure 5:
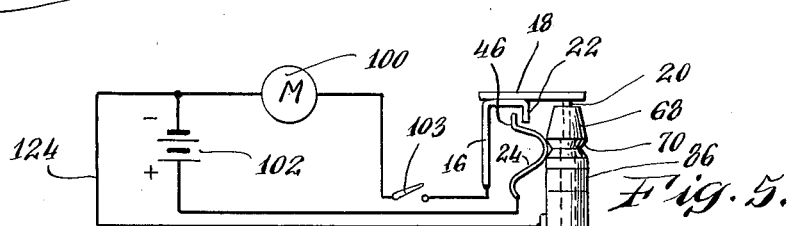
FIG. 5 is a partially schematic illustration showing the plug and jack assemblies fully mated.

The operation of the apparatus of this invention will be more apparent from the following description taken in conjunction with FIGS. 4 and 5 which represent, in partially schematic form, two stages of the switching function. With plug 28 completely withdrawn from jack 14, the condition of the jack assembly is as shown in FIG. 1, wherein the switch contacts 46 and 22 are closed. Thus the circuit between the appliance motor 100 and the self-contained storage battery 102 (FIGS. 4 and 5) is complete and the appliance will operate when control switch 103 is closed. As plug 28 is then inserted into jack 14, at first no change takes place. It is true that a connection will be established between the negative terminal of the battery 102 and sleeve 36. However, this does not establish an operative circuit. As plug 28 is inserted further into jack 14, the tip 68 comes in contact with the spring-like S-shaped switch member 24. This member is thereupon deflected and movable contact 46 moves away from stationary switch contact 22, thereby opening the circuit between motor 100 and battery 102. This condition is illustrated in FIG. 4. It is to be noted that the double-pole single-throw switch, which includes movable poles 82, 104 and stationary members 84, 106, is open so that no external power has as yet been applied to the charging circuit. It will thus be seen from FIG. 4 that the first action achieved by insertion of the plug is the disconnection of motor 100 from the battery 102.

As plug 28 is further inserted into the jack it snaps into position by virtue of the spring-like switch member 24 positioning itself in the circumferential groove 70 of plug 28. This position is shown in FIG. 5. It is important to note, however, that switch contacts 46 and 22 remain in the open position. However, stud 20 now penetrates far enough into plug 28 to push against the actuating pin 78 and force it downward against the normally open double-pole single-throw switch. This closes poles 82, 104 against contacts 84, 106 to complete the circuit from the external power supply to the full-wave rectifier. This occurs at a time when the appliance and charger are so close together as to form no shock hazard.

The charging circuit, which is contained wholly within body 30, includes a full-wave rectifier made up of diode elements 108, 110, 112 and 114. This full-wave rectifier is supplied over poles 82, 104 and switch members 84, 106 through a capacitor 116 and a resistor 118. The rectified A.C. current is then applied to the plug over conductors 120 and 122. Conductor 120 is electrically connected to tubular member 66 by means of electrical contact 96, shown in FIG. 3. The other side of the rectifier supplies power to sleeve 88 over conductor 122 by means of tab 98, as shown in FIG. 3.

By reference to FIG. 5, a complete circuit can be traced, beginning with one side of the power supply at first switch pole 82 and passing from there through capacitor 116 to one corner of the full-wave rectifier. The other side of the alternating current power supply circuit extends from second switch pole 104 to contact 106 and from there through resistor 118 to the opposite corner of the full-wave rectifier. The rectifier supplies full-wave rectified D.C. current through conductor 122 to conducting jacket 88 by tab 98. From jacket 88, current flows to jack sleeve 36 and over tab 40 and conductor 124 to the negative (−) pole of battery 102. The return path of charging current is from the positive (+) side of battery 102 to the S-shaped switch member 24 to the tip 68 of plug 28. From tip 68, current passes along tubular member 66 to tab 96 and back to the rectifier along conductor 120. At the same time it will be noted that motor 100 is completely disconnected from the circuit.

The many advantages of this invention will be apparent when it is considered that the invention has accomplished two switching actions by the simple insertion of a plug into a jack. Furthermore, these actions have been accomplished without risk of injury to any mechanical or electrical part and they are accomplished with all current-carrying portions being substantially hidden, and therefore, presenting no shock hazard.

The many advantages accruing from this invention will be apparent to those skilled in the art. It will be noted, for example, that there is no requirement that the recharging unit and the appliance be carefully realigned before connection. The plug is merely inserted into the jack. This has an additional advantage in that it allows a full 360° rotation of the parts relative to one another without in any way disturbing the connection. This is an important feature to industrial designers who are thereby given more freedom in the design concepts they may embody. Furthermore, the fact that a minimum of orientation is required, while still safely accomplishing the switching objective, makes this invention of great use in such hazardous locations as hospital operating rooms wherein several devices may be alternately monitored while using a single amplifier. By means of the invention, sparkless plural switching may be accomplished even where rapid emergency action may be required in connecting one unit to another.

Many other variations and modifications of this invention will be apparent to those skilled in the art. Accordingly, the foregoing description is to be construed as illustrative rather than limiting. This invention is limited only by the scope of the followng claims.

What I claim as new and desire to secure by Letters Patent of the United States is:

1. In electrical connecting apparatus including jack means and plug means, the improvement which comprises:

actuating pin means contained within said plug means in longitudinal sliding relationship thereto and having a first end extending therefrom;

first switch means in substantially fixed spatial relationship to said plug means and actuatable by said first end of said actuating pin means;

second switch means in substantially fixed spatial relationship to said jack means and actuatable by said plug means upon its insertion into said jack means; and stud means in substantially fixed spatial relationship to said jack means to contact a second end of said actuating pin means to actuate said first switch means upon mating of said plug and jack means.

2. The apparatus of claim 1 wherein said plug means is substantially tubular and wherein said stud means is substantially coaxial with the mated plug means.

3. The apparatus of claim 2 wherein said second switch means comprises an actuating member extending at least patrially into the path of said plug means during mating thereof with said jack means.

4. The apparatus of claim 3 wherein said plug means includes a circumferentially tapered surface slidably engageable with said actuating member.

5. The apparatus of claim 4 wherein, during mating, said second switch means is actuated prior to actuation of said first switch means.

References Cited by the Examiner
UNITED STATES PATENTS

| | | | |
|---|---|---|---|
| 2,020,402 | 11/1935 | Edwards et al. | 200—51.09 |
| 2,664,475 | 12/1953 | Harlin | 200—51.1 |
| 2,767,267 | 10/1956 | Zink | 200—51.1 |
| 2,768,234 | 10/1956 | Popp | 179—1 |
| 2,867,039 | 1/1959 | Zach | 320—2 |

BERNARD A. GILHEANY, *Primary Examiner.*

ROBERT K. SCHAEFER, *Examiner.*